(12) United States Patent
Ginsberg

(10) Patent No.: US 7,284,124 B1
(45) Date of Patent: Oct. 16, 2007

(54) TRUST LEVEL BASED PLATFORM ACCESS REGULATION APPLICATION

(75) Inventor: Michael Ginsberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1414 days.

(21) Appl. No.: 09/671,388

(22) Filed: Sep. 27, 2000

Related U.S. Application Data

(60) Provisional application No. 60/209,502, filed on Jun. 5, 2000.

(51) Int. Cl.
H04L 29/00 (2006.01)
H04L 29/02 (2006.01)

(52) U.S. Cl. .................. 713/167; 713/164; 713/166; 713/167; 719/331; 719/332; 717/165; 717/162; 717/167

(58) Field of Classification Search ............... 713/200, 713/201, 164, 165, 166, 167; 709/229, 213, 709/214, 215, 216
See application file for complete search history.

(56) References Cited

U.S. PATENT DOCUMENTS

| | | | | |
|---|---|---|---|---|
| 5,572,673 A | * | 11/1996 | Shurts ..................... 726/17 |
| 5,675,782 A | * | 10/1997 | Montague et al. ........ 713/201 |
| 5,933,498 A | * | 8/1999 | Schneck et al. ............ 705/54 |
| 5,958,050 A | * | 9/1999 | Griffin et al. .............. 713/200 |
| 6,163,844 A | * | 12/2000 | Duncan et al. ............ 713/201 |
| 6,260,069 B1 | * | 7/2001 | Anglin ....................... 709/229 |
| 6,289,462 B1 | * | 9/2001 | McNabb et al. ............ 713/201 |
| 6,292,900 B1 | * | 9/2001 | Ngo et al. .................... 726/6 |
| 6,505,300 B2 | * | 1/2003 | Chan et al. ................. 713/164 |
| 6,546,487 B1 | * | 4/2003 | McManis ..................... 713/169 |
| 6,785,728 B1 | * | 8/2004 | Schneider et al. .......... 709/229 |
| 6,871,277 B1 | * | 3/2005 | Keronen ..................... 713/167 |
| 6,990,492 B2 | * | 1/2006 | Gupta ........................... 707/9 |
| 7,086,085 B1 | * | 8/2006 | Brown et al. ................. 726/7 |
| 7,194,092 B1 | * | 3/2007 | England et al. ............. 380/262 |
| 2004/0049687 A1 | * | 3/2004 | Orsini et al ................ 713/189 |
| 2005/0060549 A1 | * | 3/2005 | England et al. ............. 713/175 |
| 2005/0289067 A1 | * | 12/2005 | Lampson et al. ............. 705/51 |

OTHER PUBLICATIONS

Arbaugh, W. A., et al.: "Security for Virtual Private Intranets", *Computer*, vol. 31, No. 9, Sep. 1998, p. 48-55
Meyer, B., et al.: "Providing Trusted Components to the Industry", *Computer*, vol. 32, No. 5, May 1998, p. 104-105.

* cited by examiner

Primary Examiner—Syed A. Zia
(74) Attorney, Agent, or Firm—Amin, Turocy & Calvin, LLP

(57) ABSTRACT

The present invention provides a system and method for regulating access to a computer platform via a provably trustworthy trust level generator and monitor. The present invention comprises an operating system component that recognizes when applications desire access to a distributed platform. The operating system component is responsible for regulating access to the platform. Such regulation may be achieved by, for example, refusing to load the application or by limiting calls that an application can make through one or more Application Programming Interfaces. The present invention further comprises a distributed platform analysis component for analyzing applications attempting to access a distributed platform and for establishing a trust level for the application. The present invention further provides a system and method for monitoring the trust level established by the analysis program for separate interpretation of the trust level of other modules called by the application seeking access to the distributed platform.

19 Claims, 8 Drawing Sheets

|  |  | DLL 102 |  |  |
|---|---|---|---|---|
|  |  | Fully Trusted | Run Restricted | Fail To Load |
| APPLICATION 100 | Fully Trusted | Fully Trusted | Load Fails | Load Fails |
|  | Run Restricted | Run Restricted | Run Restricted | Load Fails |
|  | Fail To Load | Load Fails | Load Fails | Load Fails |

Fig. 5

TRUST LEVEL BASED PLATFORM ACCESS REGULATION APPLICATION

REFERENCE TO RELATED APPLICATION

This application claims the benefit of U.S. Provisional Patent Application Ser. No. 60/209,502, which was filed Jun. 5, 2000, entitled TRUST LEVEL BASED API SERVICES.

TECHNICAL FIELD

The present invention relates generally to computer systems. More particularly it relates to regulating access to a computer platform via a trust level generator and trust level monitor.

BACKGROUND OF THE INVENTION

With the growth of distributed computing it has become common for many applications to seek access to other computers. Manufacturers of distributed computing platforms may want independent software producers to create applications to run on the distributed platform. Creating applications for a distributed platform is facilitated by exposing the internals of the distributed platform to the programming community. Such an exposed platform may be referred to as an open platform.

Although the platform developer may desire an open platform, the platform developer may still desire to restrict access to the platform to trusted applications that perform desired processes with no undesired effects. Conventionally, such access has been regulated by a software application. However, such a software application may itself not be provably trustworthy by the platform. Further, conventional access regulation systems have provided only a binary solution, either granting or denying access. Further still, many conventional access regulation systems generally provided application level verification.

As distributed platforms have become smaller, it has become more common to embed certain programs in the distributed platform. Some embedded programs may be developed and tested by the distributed platform manufacturer and thus may be considered trustworthy. Other embedded programs may have been developed and tested by third parties and thus may not be considered trustworthy. However, conventional access regulation systems may have treated such programs similarly.

Thus, there is a need for an access regulation system that is provably trustworthy, that can provide greater flexibility than a binary response and that can analyze and interact with a computing environment, rather than simply with stand alone applications.

SUMMARY OF THE INVENTION

The present invention provides an operating system component that determines when an application desires access to a distributed platform. One method an application may use to access a platform is via one or more application programming interfaces (APIs). The operating system component regulates access to the platform and such regulation may be achieved via limiting calls that an application can make through one or more APIs. The present invention further includes a distributed platform trustworthiness analysis application for analyzing applications attempting to access a distributed platform. The analysis application establishes a trust level for the application seeking to access the distributed platform. The trust level determines which calls, if any, to one or more APIs may be permitted. The present invention further includes a component for monitoring the trust level established by the verification program for separate interpretation of the trust level of other modules called by the application that desires access to the distributed platform. The trust level monitoring program thus facilitates interaction with a program and the programming environment in which it is executed.

If a trust level is established for an application seeking access to the distributed platform, that trust level may be examined when the application calls other modules, for example dynamic link libraries. If the dynamic link library has a lower trust level than the application, the dynamic link library may not be permitted to load and thus may be denied access to the distributed platform. Thus, a trusted application may not be compromised by a less trusted library. Conversely, if a "run restricted" application calls a "fully trusted" dynamic link library, the dynamic link library may be treated as though it were "run restricted", because of its association with the "run restricted" application.

Thus, as illustrated above, the present invention mitigates the problem in conventional systems of a binary response to verification of access to distributed platforms by providing for at least three trust levels for applications. Further, the present invention also mitigates the problems associated with conventional systems concerning analyzing applications individually, without regard to the trust environment. Still further, since the operating system component and the analysis component may be embedded in ROM in the distributed platform, the operating system component and the analysis component may be verifiably trust-worthy, solving yet another problem.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 5 is a table illustrating the interaction between trust levels of modules in accordance with an aspect of the present invention;

DETAILED DESCRIPTION OF THE INVENTION

Figure 1:
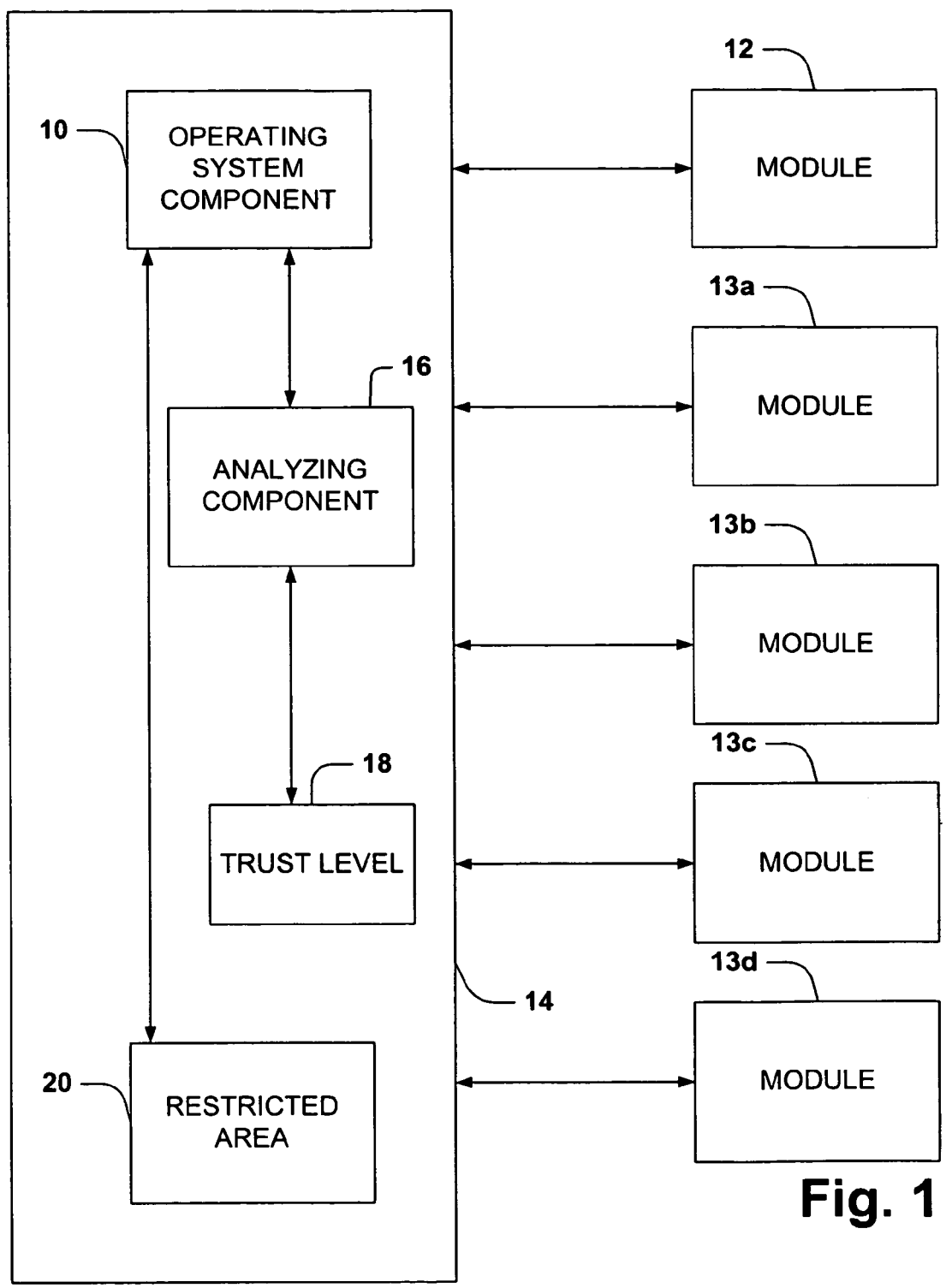
FIG. 1 is a schematic block diagram illustrating the establishment of a trust level for a module in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

FIG. 1 is a schematic block diagram illustrating an operating system component 10 for detecting when a module 12 seeks to run on a distributed platform 14. For example, the operating system component 10 may receive a signal or a command to load the module 12. If the operating system component 10 determines that the module 12 seeks to run on the distributed platform 14, then the operating system component 10 may transmit the module 12 to an analyzing component 16 that will establish and store a trust level 18 for the module 12 in accordance with an aspect of the present invention. The analyzing component 16 may establish, for example, one of three values for the trust level 18 for the module 12, such as (1) fully trusted, (2) run restricted, and (3) fail to load. For example, the analyzing component 16 may verify a checksum, or may apply an integrity algorithm to the module 12 to determine whether it should be permitted access to a restricted area 20 of the distributed platform 14. The trust level 18 may be employed to restrict the module's 12 access to the restricted area 20 in the distributed platform 14.

For example, a first trust level may allow the module 12 read and write access to the restricted area 20 while a second trust level may allow the module 12 read-only access to the restricted area 20. Allowing multiple trust levels mitigates the binary response to verification problems. Conventionally, programs either had complete access or no access. While some programs may not be trustworthy enough to read and write the restricted area 20 of the distributed platform 14, those programs may be trustworthy enough to read the restricted area 20 and thus the multiple trust levels enable improved control of access to the distributed platform 14.

For example, a cellular telephone distributed platform may include an embedded operating system and an embedded analyzing program. The operating system may include a component 10 to determine when a module 13a is trying load onto the cell phone. Before loading the module 13a, the operating system component 10 may transmit the module 13a to the embedded analyzing component 16, which determines whether the module 13a may access the cell phone, and thus whether the module may execute, and if so, with what level of trust. The embedded analyzing component may establish, for example, one of three trust levels for the module, like (1) fully trusted, (2) run restricted, and (3) fail to load. Based on the trust level established, the module 13a, if permitted to load, may be permitted to read and write the restricted areas of the cell phone, or it may only be permitted to read the restricted areas. One such restricted area may be the registry area of the cell phone.

To determine the trust level 18, the analyzing component 16 may utilize one or more trustworthiness verification techniques well known in the art. For example, if a module 13b written by cell phone manufacturer seeks to load onto the cell phone, that program may contain an encrypted key known to the analyzing component 16 and a cyclic redundancy character generated by an algorithm known to the analyzing component 16. The module 13b may be transmitted to the analyzing component 16 that will verify the key and the cyclic redundancy character and establish a "fully trusted" trust level. Further illustrating how a trust level 18 may be established, consider another module 13c, also written by the cell phone manufacturer, that may seek to load onto the cell phone. This module 13c may have been hacked by a third party and thus either the encrypted key or the cyclic redundancy character may not be in a desired state. Thus, the analyzing component 16 may establish a "fail to load" trust level 18. Yet another module 13d, written by a third party, may also seek to load onto the cell phone. The analyzing component 16 may scan the module 13d for viruses or other code that would make the module 13d not trustworthy. After establishing that the module 13d is not going to compromise the cell phone, the analyzing component 16 may establish a "run restricted" trust level to allow the application to run on the cell phone but not to allow it to alter the internals of the cell phone. Thus, third party applications may be written for the cell phone without compromising the cell phone security, based upon the methods for establishing a trust level 18 described above.

Figure 2:
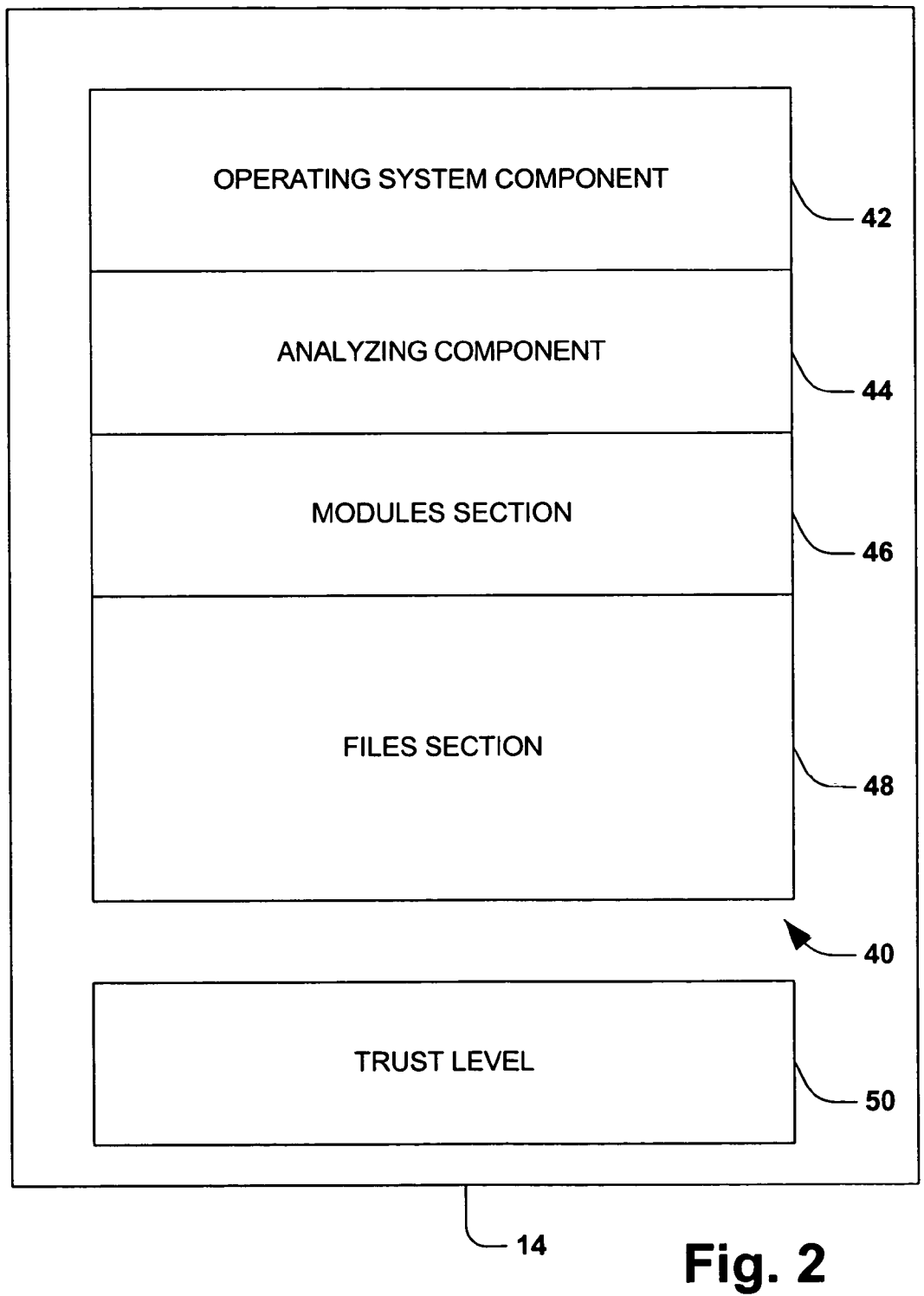
FIG. 2 is a schematic block diagram illustrating a Read Only Memory (ROM) containing an operating system component and a verification component in accordance with an aspect of the present invention.

FIG. 2 is a schematic block diagram illustrating a Read Only Memory (ROM) 40 containing an operating system component 42 and an analyzing component 44. By the manufacturer of the distributed platform 14 embedding the operating system component 42 and the analyzing component 44 in the ROM 40, both the operating system component 42 and the analyzing component 44 may be treated as trustworthy by the distributed platform 14. Conventionally, the operating system component 42 was stored in Random Access Memory (RAM), which is vulnerable to corruption. Similarly, the analyzing component 44 was conventionally stored in RAM, similarly subject to corruption. Because the operating system component 42 and the analyzing component 44 were subject to corruption, they were not verifiably trustworthy.

The ROM 40 may also contain a modules section 46 and a files section 48. The modules section 46 may be utilized by the manufacturer of the distributed platform 14 to embed programs that have been pre-analyzed and pre-determined to be fully trustworthy. Similarly, the files section 48 may be utilized by the manufacturer of the distributed platform 14 to embed programs that have not been pre-analyzed and pre-determined to be fully trustworthy yet which the manufacturer desires to have embedded in the distributed platform. Programs placed in the modules section 46 may not be transmitted by the operating system component 42 to the analyzing component 44 as they may be treated as trustworthy by the distributed platform 14. Such programs may automatically have their trust level 50 set to "fully trusted", for example. Similarly, the ROM 40 may contain the files section 48 which may also contain programs. But the programs in the files section may not be automatically granted a "fully trusted" trust level 50 and thus may be transmitted to the analyzing component 44 because they may not be treated as trustworthy. Embedding the operating system component 42 and the verification component 44 in the ROM 40 mitigates the problem in the prior art of having a verification component that is not itself verifiably trustworthy.

Figure 3A:
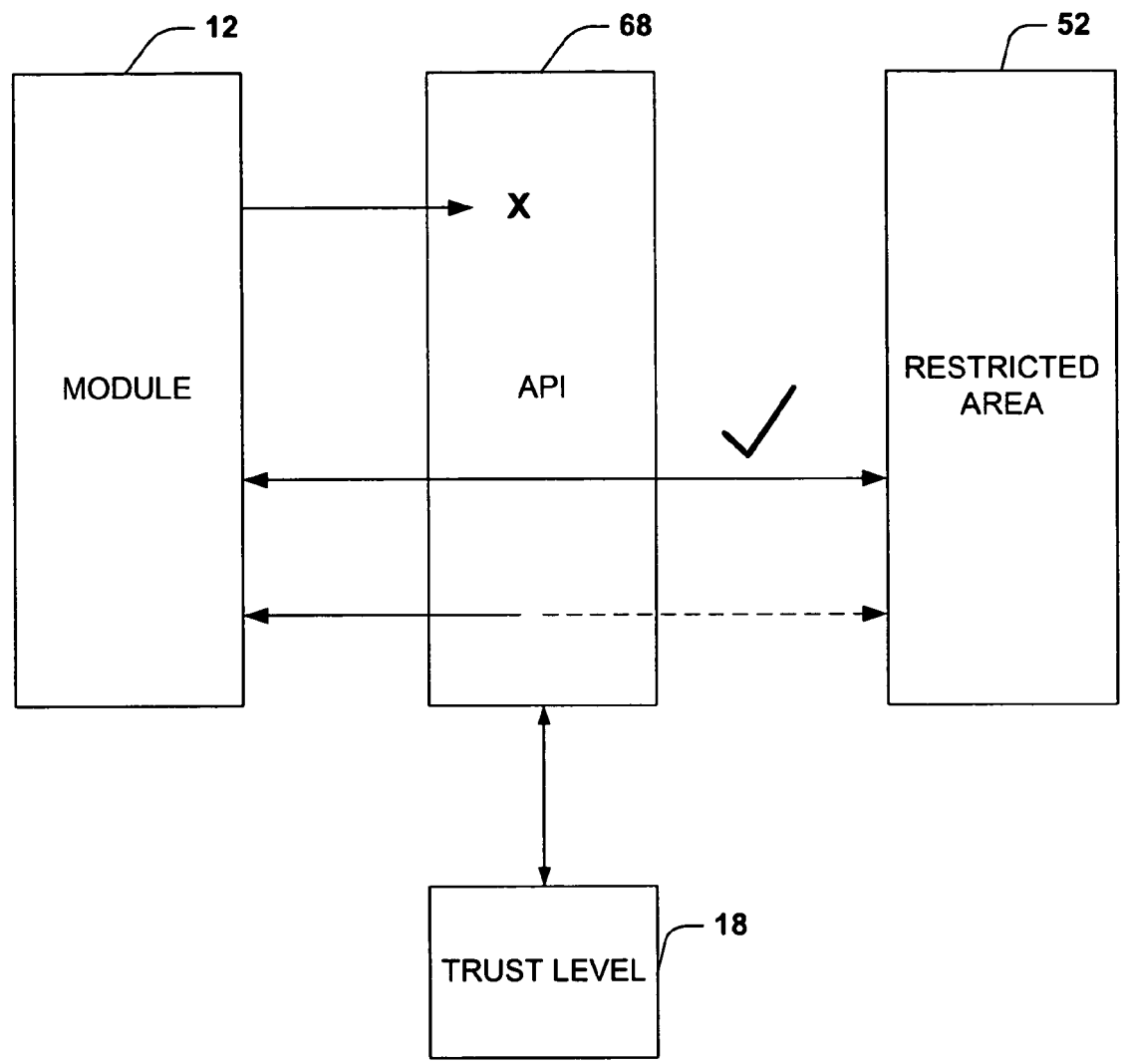
FIG. 3A is a schematic block diagram illustrating a module's access to a restricted area being limited via a trust level being applied to an Application Programming Interface (API)

FIG. 3A is a schematic block diagram illustrating a module 12 having access to a restricted area 52 limited by the application of a trust level 18 to an API 68. The module 12 may make one or more calls that are intended to read and or write the restricted area 52. Some calls may be blocked in the API 68 by the application of the trust level 18. But other calls may not be blocked in the API 68 by the application of the trust level 18 and may thus read and write the restricted area 52. Still other calls may be partially blocked in the API 68 by the application of the trust level 18 and thus may read but not write the restricted area 52.

Figure 3B:
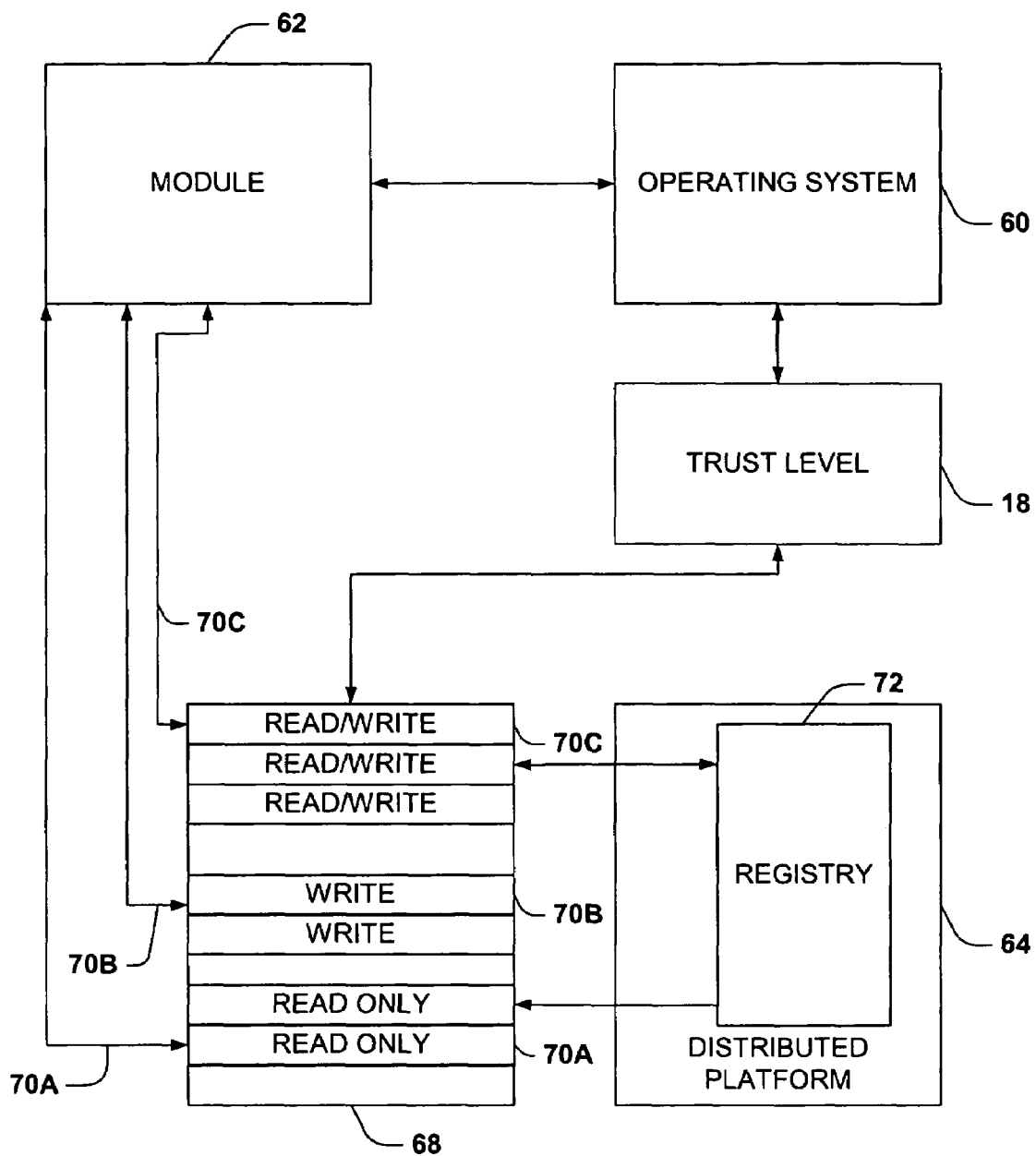
FIG. 3B is a schematic block diagram illustrating a module's access to a distributed platform being limited via a trust level selectively limiting calls to an API in accordance with an aspect of the present invention.

FIG. 3B is a schematic block diagram illustrating an operating system component 60 limiting a module's 62 access to a distributed platform 64 by applying the trust level 18, established, for example, using the methods described in the description associated with FIG. 1, to selectively limit the module's 62 ability to make calls to an Application Programming Interface (API) 68. A plurality of calls may be directed to the API 68 from the module 62. The calls may include, for example, calls to read and/or write an area in the distributed platform 64, and to perform some logic processing and/or to perform some input/output processing on the distributed platform 64 for example. If a "fully trusted" trust level 66 was established, for example, after the analyzing component 16 (FIG. 1) verified an encrypted keyword and CRC, then all calls from the module 62 to the API 68 may be permitted to access the distributed platform 64. But if a "run restricted" trust level 66 was established, for example, after the analyzing component 16 determined that no viruses were present in a third party module 12, then some calls may selectively be blocked. For example, a call 70A for reading part of a registry 72 of the distributed platform 64 may be permitted while a call 70B for writing to the registry 72 may not be permitted based upon the determined trust level. Similarly, a call 70C may have both reading and writing components and may be partially disabled, allowing the reading functionality to process but not allowing the writing functionality to process. Allowing some calls to complete successfully, while preventing other calls from completing, facilitates multiple levels of trust, thus mitigating the binary access/no-access response problem associated with conventional systems.

Figure 4:
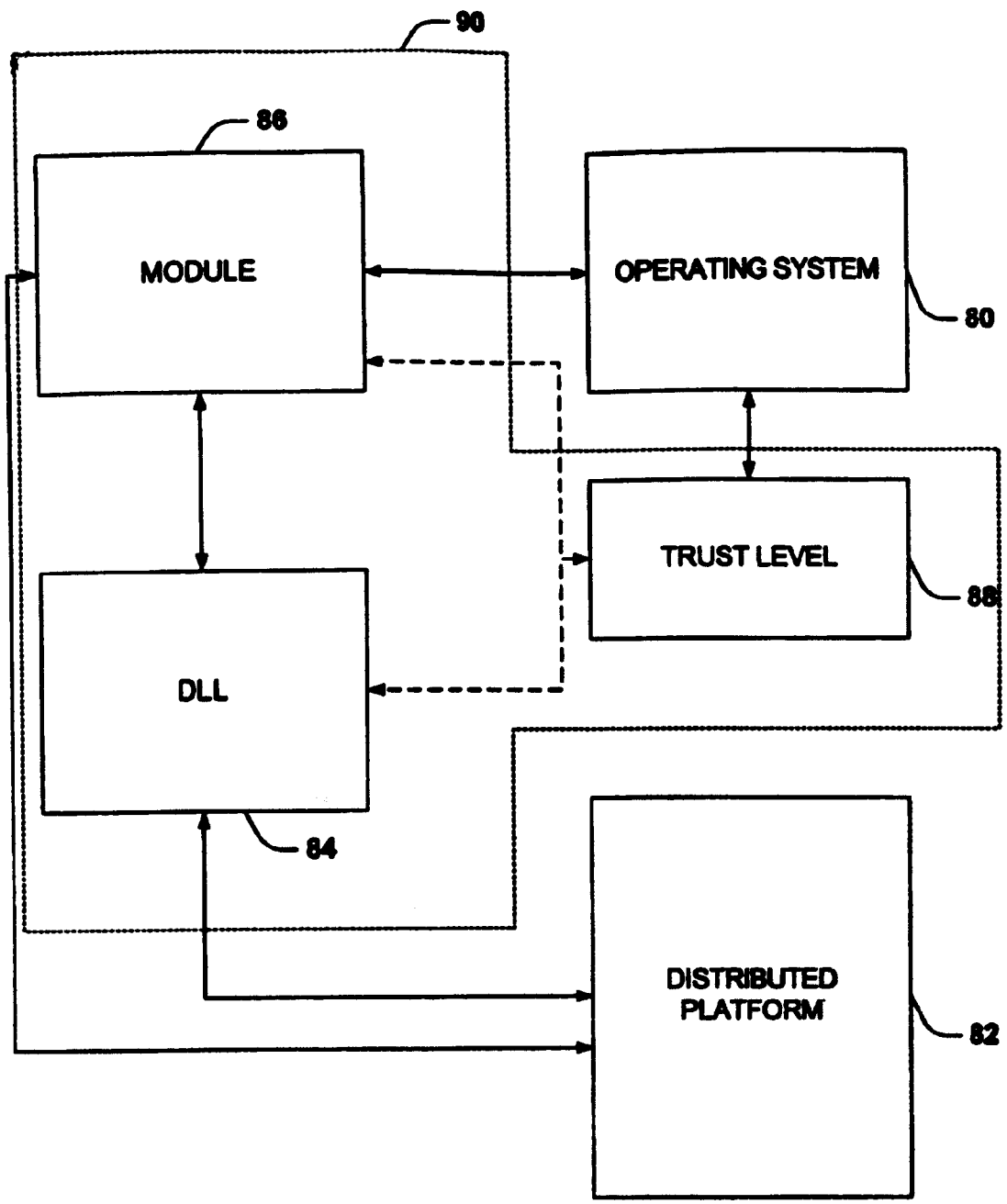
FIG. 4 is a schematic block diagram illustrating a second module's access to a distributed platform being limited by applying the trust level established for the calling module in accordance with an aspect of the present invention.

FIG. 4 is a schematic block diagram illustrating an operating system component 80 limiting access to a distributed platform 82 by a second module 84 called by a first module 86 by applying a trust level 88 established for the first module 86. As discussed above, the trust level 88 may have been determined by the analyzing component 16 (FIG. 1) applying one or more well known verification algorithms and/or techniques. The first module 86 may be an application with a certain limited functionality. Thus, the first module 86 may rely on one or more second modules 84 to perform additional functionality. Both the first module 86 and the second module 84 may have their own trust level but the trust level 88 of the first module 86 is utilized to determine the relative trust level of the second module 84. Such a relative trust level may differ from the trust level that the second module 84 would have received if it had been analyzed individually. Thus, the second module 84 is analyzed not only by itself but as part of an application environment 90 that includes the context of the first module 86 and its associated trust level 88. Interaction of relative trust levels between modules is illustrated below, in FIG. 5.

FIG. 5 is a table illustrating the interaction between trust levels of an application 100 calling a Dynamic Link Library (DLL) 102 as discussed in the description accompanying FIG. 4. If the application 100 is "fully trusted", and the DLL 102 is "fully trusted", then the DLL 102 is treated as "fully trusted". But if the application 100 is "fully trusted" and the DLL 102 trust level is analyzed to be "run restricted", then the DLL 102 may not be permitted to load since its lower trust level may compromise the "fully trusted" status of the application 100. Thus, applications with higher trust levels are not corrupted by DLLs with lower trust levels. If the application 100 is "run restricted" and calls the DLL 102 that is "fully trusted", then the DLL 102 may be downgraded to "run restricted" because of its association with the application 100. Thus, a less trusted application may not be permitted greater access via a more trusted DLL.

Figure 6:
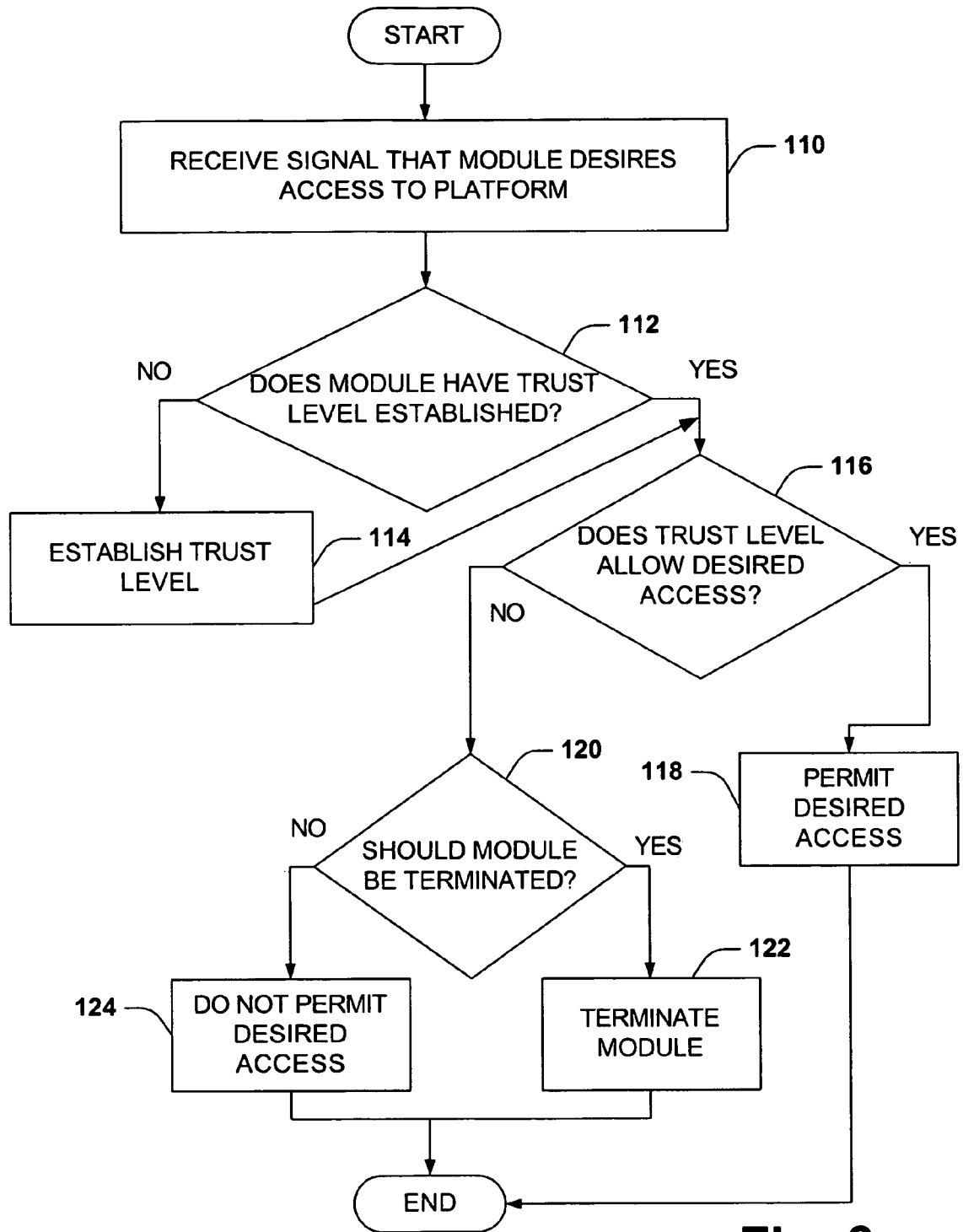
FIG. 6 is a flow chart illustrating a method for regulating access to a platform in accordance with an aspect of the present invention.

FIG. 6 is a flow chart illustrating a method for regulating access to a platform. At step 110 a signal is received indicating that a module desires access to a platform. For example, the operating system may receive an interrupt indicating that a module seeks to load and/or the operating system may receive a call intended for an API. At step 112, a determination is made concerning whether the module already has a trust level established. For example, a module seeking to load for the first time may not have a trust level established because it has not yet been analyzed for trustworthiness while a module already loaded but seeking to make a call via an API may have a trust level established because it has already been analyzed for trustworthiness. If the determination at step 112 is that no trust level has been established, then at step 114 the trust level is established. Step 114 is illustrated further in FIG. 7. If the determination at step 112 is that a trust level has been established, then at step 116 a determination is made to determine whether the trust level is high enough to allow the desired access. If the trust level meets or exceeds a pre-determined threshold level, then at step 118, the desired access is permitted. Such a threshold level may be, for example, "fully trusted". It is to be appreciated by one skilled in the art that different modules may have different threshold levels. For example, the module may be permitted to load, or the call to the API may be permitted to complete. If the trust level does not meet or exceed a pre-determined threshold level, then at step 120 a determination is made concerning whether the module should be terminated. If the module should be terminated, then at step 122 the module is terminated. For example, if the module was trying to write to a part of the platform that only the operating system is permitted to access, then the module may need to be terminated. If the module should not be terminated, then at step 124 the desired functionality is not permitted. For example, the module may not be loaded or the call to the API may not be permitted to complete.

Figure 7:
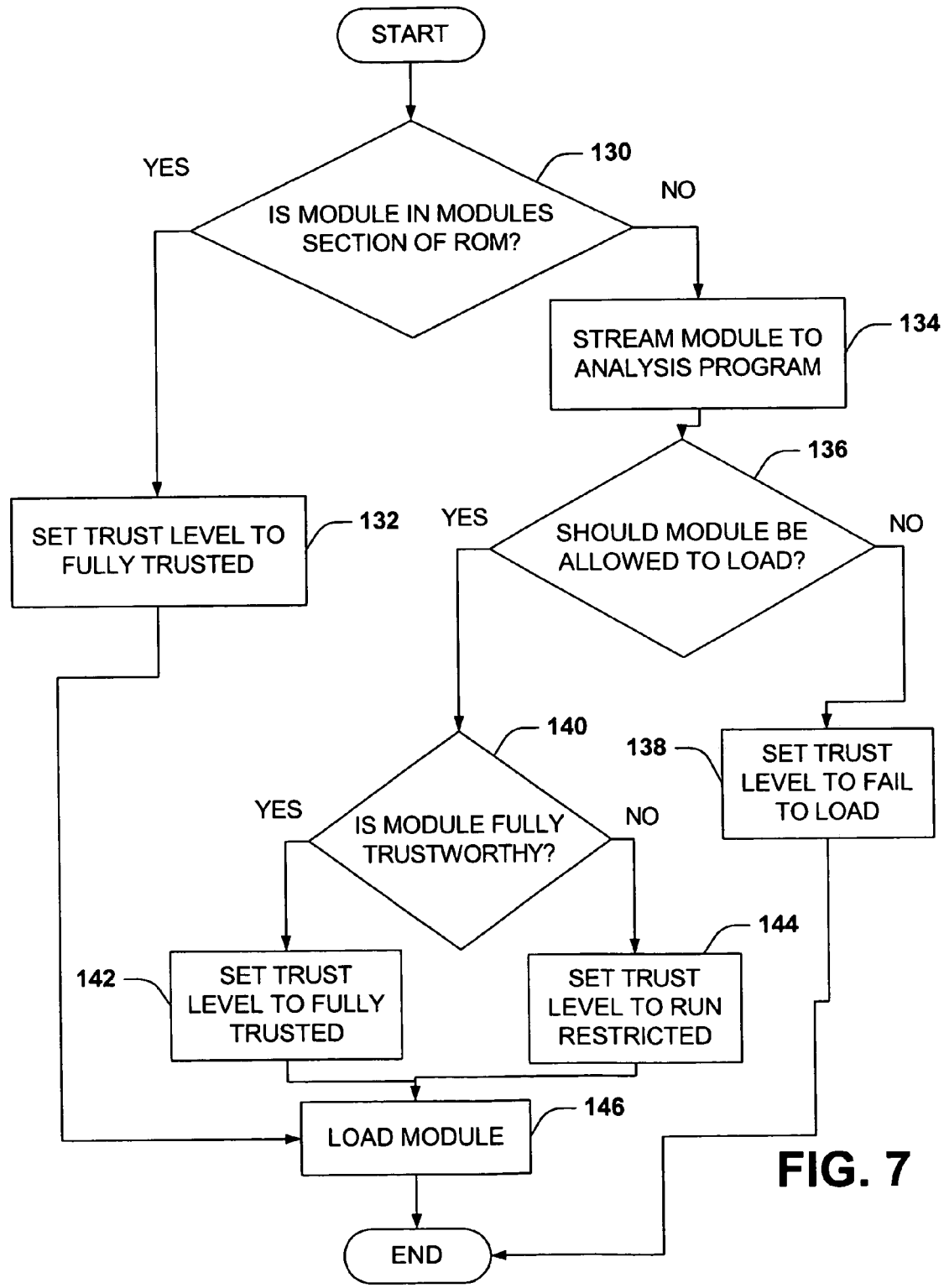
FIG. 7 is a flow chart illustrating a method for establishing a trust level for a module in accordance with an aspect of the present invention.

FIG. 7 is a flow chart illustrating a method for establishing a trust level for a module. As discussed above, some modules may be pre-analyzed by the platform developer and thus pre-determined to be fully trustworthy. Such modules may be stored in a section of a ROM on the platform known as a modules section. At step 130 a determination is made whether the module is in the modules section of the ROM. If the module is in the modules section of the ROM, then at step 132 the trust level for the module is set to "fully trusted". Modules in the modules section of the ROM are located in that section by the manufacturer of the platform to indicate that they should be accorded "fully trusted" status. If the module is not in the modules section of the ROM, then at step 134, the module is transmitted to the analysis program to determine its trust level. At step 136, the results of the analysis are examined. If the analysis determined that the module should not be loaded, for example if a virus was detected or if destructive code was encountered, then at step 138 a trust level of "load fail" is established, the module is not loaded and the transmitted version is deleted from the process space associated with the analysis program. If the analysis determined that the module should be permitted to load, for example, one or more of the verification algorithms and/or techniques well known in the art indicate that the module is trustworthy, then at step 140 a determination is made whether the module is fully trustworthy. If the module is fully trustworthy, then at step 142 a trust level of "fully trusted" is generated and stored in the process space associated with the module. If the module is not fully trusted, then at step 144 a trust level of "run restricted" is generated and stored in the process associated with the module. Then at step 146, the module is loaded and run, subject to the trust level established.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising."

What is claimed is:

1. A system that regulates access to a distributed computing platform comprising:
    a component that analyzes an application that requests access to the distributed computing platform, the component determines a level of access to the distributed computing platform and applies a trust level to the application corresponding to the determined level of access; and
    a component that compares the applied trust level of the application with a trust level of a module called by the application and regulates access of the application to the distributed computing platform based at least in part upon the comparison.

2. The system of claim 1, the component that analyzes the application providing for inheritance of the trust level.

3. The system of claim 1, the component that analyzes the application providing for marking the application with at least one of states: (1) fully trusted, (2) run restricted, and (3) fail to load.

4. The system of claim 1, wherein the component that analyzes and the component that compares are stored in a Read Only Memory (ROM) in the platform.

5. The system of claim 1, wherein the component that analyzes and the component that compares are part of an operating system.

6. The system of claim 1, wherein the functionality of one or more Application Programming Interface (API) calls, when called by the application, are selectively restricted.

7. The system of claim 6, wherein selectively restricting the functionality of the one or more API calls includes restricting the functionality to read functions.

8. The system of claim 7, wherein selectively restricting the functionality of the one or more API calls includes terminating the application.

9. A system for regulating access to a distributed computing platform, comprising:
    means for determining a trust level for an application, the application requesting access to the distributed computing platform;
    means for applying the trust level to the application to regulate access to the distributed computing platform; and
    means for regulating access of the application to the distributed computing platform by analyzing a trust level of a module called by the application.

10. The system of claim 9 further comprising means for applying the trust level to one or more modules called by the application.

11. A method for regulating access to a distributed computing platform, comprising the steps of:
    determining a trust level for a first module called by an application, the application requesting access to the distributed computing platform; and
    regulating access of the application to the distributed computing platform based at least in part upon the determined level of trust for the first module.

12. The method of claim 11 wherein determining the trust level for the first module further comprises the step of marking the first module with at least one of states: (1) fully trusted, (2) run restricted, and (3) fail to load.

13. The method of claim 11 wherein determining the trust level for the first module further comprises transmitting the first module to a verification program.

14. The method of claim 11 wherein regulating access to the distributed computing platform further comprises selectively aborting calls made to one or more APIs.

15. The method of claim 11 wherein regulating access to the distributed computing platform further comprises selectively terminating the first module.

16. The method of claim 11 wherein a program for determining the trust level for the first module is stored in a ROM in the platform.

17. The method of claim 11 wherein the logic for applying the trust level to regulate access to the platform is stored in a ROM in the platform.

18. The method of claim 11 wherein the trust level may be inherited.

19. The method of claim 11 wherein the trust level may be applied to one or more second modules called by the first module.

* * * * *